(12) United States Patent
Kameda et al.

(10) Patent No.: US 7,059,645 B2
(45) Date of Patent: Jun. 13, 2006

(54) PALM MECHANISM FOR ROBOT HAND

(75) Inventors: Hiroshi Kameda, Nagano-ken (JP);
Junji Koyama, Nagano-ken (JP); Teizo Morimoto, Nagano-ken (JP);
Masakatsu Sasahara, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 118 days.

(21) Appl. No.: 10/677,354

(22) Filed: Oct. 3, 2003

(65) Prior Publication Data

US 2005/0040663 A1  Feb. 24, 2005

(30) Foreign Application Priority Data

Oct. 7, 2002  (JP)  ............................. 2002-293652
Dec. 20, 2002  (JP)  ............................. 2002-369082

(51) Int. Cl.
*B25J 15/10* (2006.01)
(52) U.S. Cl. ......................................... 294/106; 901/31
(58) Field of Classification Search ................ 294/106, 294/907; 901/25, 26, 32, 33, 34, 38; 623/63, 623/64
See application file for complete search history.

(56) References Cited

U.S. PATENT DOCUMENTS

| | | | | |
|---|---|---|---|---|
| 3,694,021 A | * | 9/1972 | Mullen | ........................ 294/106 |
| 4,496,279 A | * | 1/1985 | Langer | ........................ 414/735 |
| 4,573,727 A | * | 3/1986 | Iikura | ........................ 294/115 |
| 4,623,183 A | * | 11/1986 | Aomori | ........................ 294/86.4 |
| 5,437,490 A | * | 8/1995 | Mimura et al. | ............. 294/106 |
| 5,501,498 A | * | 3/1996 | Ulrich | ........................ 294/106 |
| 6,119,542 A | * | 9/2000 | Arbrink | ................... 74/490.03 |

* cited by examiner

*Primary Examiner*—Eileen D. Lillis
*Assistant Examiner*—Esther Onyinyechi Okezie
(74) *Attorney, Agent, or Firm*—Buchanan Ingersoll PC (57) ABSTRACT

A palm mechanism for a high-speed robot hand has a fixed-side articulated finger unit that projects forward from an upper side of a vertically positioned palm plate, and moveable-side articulated finger units disposed on both sides thereof. The left and right articulated finger units are capable of turning along two short sides of the rectangular palm plate from upper end positions on the palm mechanism. The articulated finger units are capable of bending up and down about joint portions thereof. A variety of operations, including gripping, picking, and throwing, can be performed rapidly and reliably by controlling relative positions of the three articulated finger units and controlling bending operations of the articulated finger units.

7 Claims, 9 Drawing Sheets

PALM MECHANISM FOR ROBOT HAND

CROSS-REFERENCE TO RELATED APPLICATIONS

This application claims priority under 35 U.S.C. § 119 to JP 2002-293652 filed in Japan on Oct. 7, 2002, and to JP 2002-369082 filed in Japan on Dec. 20, 2002, the entire contents of which are hereby incorporated by reference.

BACKGROUND OF THE INVENTION

1. Field of the Invention

The present invention relates to a palm mechanism for a robot hand that is capable of accurately catching flying objects and the like at high speeds.

2. Description of the Related Art

Conventional palm mechanisms for robot hands have, in the case of a palm mechanism composed of a total of five fingers, for example, a structure in which four of the fingers are fixed in a row on one side of the external periphery of the palm, and the remaining finger is fixed in a location that is 180° on the opposite side of the palm with respect to these four fingers. Most of these palm mechanisms simultaneously bend each of the four fingers positioned on one side of the palm and the one finger positioned on the other side of the palm, and catch objects, pick objects, or perform other simple actions at a speed approximately equivalent to that of a human.

SUMMARY OF THE INVENTION

It would be convenient in this case if the one finger positioned opposite the four fingers were configured so as to be capable of turning along the palm because operations such as gripping objects could be performed in a greater variety of patterns due to the fact that the relative position of the one finger would be freely variable with respect to the four fingers. A mechanism comprising a servo actuator, a transmitting mechanism comprising a combination of pinions and internal gears, or a transmitting mechanism that makes use of a belt and rope may be considered as a mechanism for turning the finger. However, all of these have complex and weighty structures and make it difficult to perform quick and accurate operations.

An object of the present invention is to provide a palm mechanism for a robot hand that is capable of performing a variety of hand operations by which the finger can be moved at high speed in accordance with an objective and be deployed in a predetermined position in conjunction with rapid and accurate finger operation.

To solve the above-stated drawbacks, a palm mechanism for a robot hand of the present invention is provided with fingers for a robot hand that operate with much greater accuracy and speed than the operating speed of body organs in response to human visual recognition, wherein the fingers include a finger that is fixed to a palm, and a plurality of fingers that turn around the periphery of the palm.

In other words, the palm mechanism for a robot hand according to the present invention comprises:

a palm plate, at least a first and second finger units, a turning actuator fixed facing forward at a rear side of the palm plate, and a turning plate fixed perpendicularly to a rotational output shaft of the turning actuator;

wherein the first and second finger units each comprise an actuator having a rotational output shaft, a finger main body, and a joint portion that links the rotational output shaft and the finger main body, the actuator of the first finger unit is fixed facing forward at the palm plate, and the joint portion and the finger main body project forward from a front surface of the palm plate, the actuator of the second finger unit is fixed facing forward at the turning plate, and the joint portion and the finger main body project forward from the front surface of the palm plate, the actuator is driven to allow the finger main body to be bent around the joint portion to a predetermined angle in a direction away from the front surface of the palm plate and in a direction toward the front surface of the palm plate from a center position that extends along a center axis of the rotational output shaft, and the turning actuator is driven to allow the second finger unit to be turned to a predetermined angle around a center axis of rotation of the turning actuator in a direction away from a position adjacent to the first finger unit.

A plurality of first and second finger units may be provided respectively, and in the case that two second finger units and two turning actuators to turn these finger units are provided, these two second finger units may be positioned symmetrically on both sides of the first finger unit.

The first and second finger units may each comprise:

a mounting flange fixed to the palm plate, said actuator fixed at its front-end portion to the mounting flange, a drive-side bevel gear coaxially fixed to a tip portion of the rotational output shaft that passes through and projects forward from the mounting flange, a pair of bearing housings that extends in the forward direction away from the front surface of the mounting flange through positions on both sides of the drive-side bevel gear, bearings mounted in the bearing housings, a joint shaft rotatably supported at both ends by the bearings, and aligned in a direction perpendicular to the center axis of the rotational output shaft of the actuator, a driven-side bevel gear coaxially fixed on an outer peripheral surface of the joint shaft, and engaged with the drive-side bevel gear, a connecting member having one end fixed to the joint shaft, and extending in a direction perpendicular to the joint shaft, and a finger main body connected to a tip portion of the connecting member.

To allow a bevel gear to move without backlash, a spring plate is preferably mounted on an external end surface of the bearings in order to restrict the axial bias of the driven-side bevel gear fixed to the joint shaft.

A strain gauge is mounted on a side surface of the connecting member to detect torque transmitted through the connecting member, so that the torque is detected without detecting a motor current of the actuator, and the transmitted torque of the finger unit is controlled.

The joint shaft, which is the center of bending, is preferably a hollow joint shaft comprising a hollow portion for wiring so that the wiring drawn out from the fingertip side does not swing vertically or horizontally beyond the joint portion.

To provide multi-articulation to the finger unit according to the present invention, a structure similar to that of the finger main body and the joint portion described above should be connected to the tip of the finger main body. In the case of a two-jointed finger unit, for example, the structure should comprise:

a second connecting member connected to the tip portion of the finger main body, a second actuator coaxially mounted on the second connecting member, and housed in the hollow finger main body, a second drive-side bevel gear coaxially fixed to a tip portion of the rotational output shaft of the second actuator, a pair of second bearing housings that are formed on the second connecting member and are extended in the forward direction through positions on both sides of the second drive-side bevel gear, second bearings mounted in the second bearing housings, a second joint shaft rotatably supported at both ends by the second bearings, and aligned in a direction perpendicular to a center axis of the rotational output shaft of the second actuator, a second driven-side bevel gear coaxially fixed on an outer peripheral surface of the second joint shaft, and engaged with the second drive-side bevel gear, a third connecting member having one end fixed to the second joint shaft, and extending in a direction perpendicular to the second joint shaft, and a second finger main body connected to a tip portion of the third connecting member.

DESCRIPTION OF THE PREFERRED EMBODIMENTS

A palm mechanism for a high-speed robot hand to which the present invention has been applied is described below with reference to the diagrams.

Figure 1:
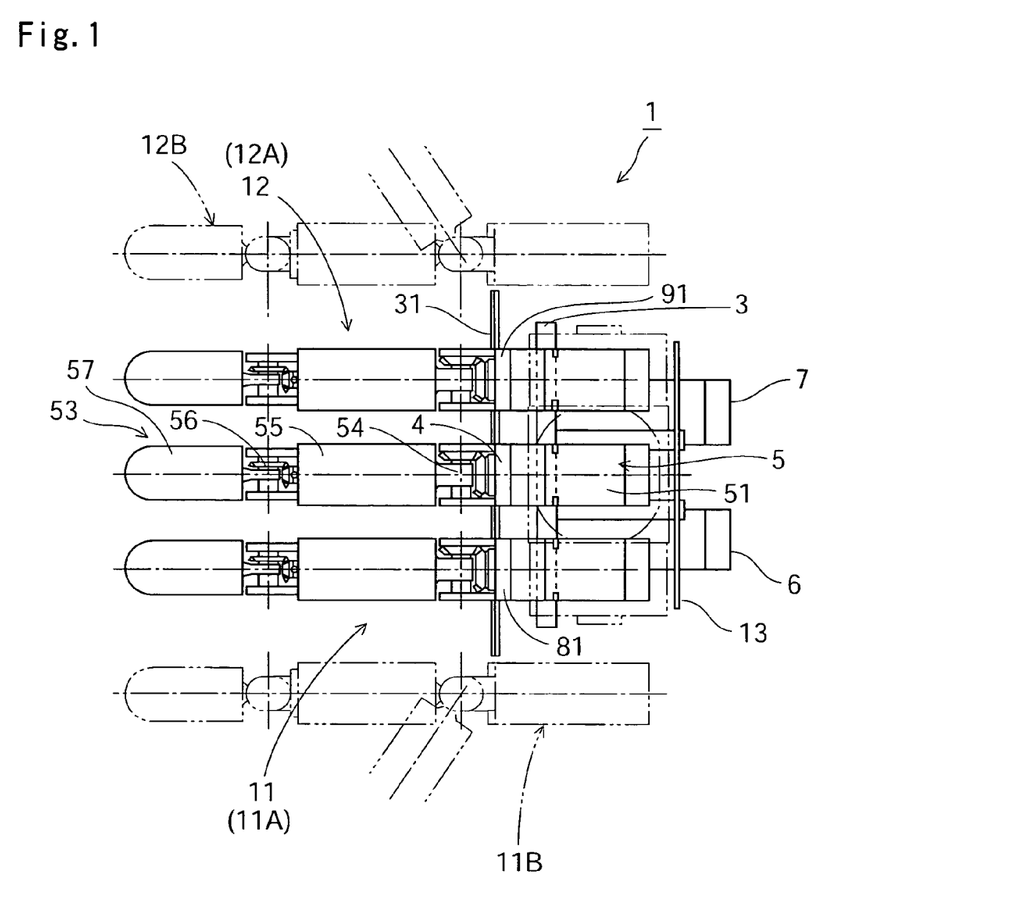
FIG. 1 is a top view showing the palm mechanism for a high-speed robot hand to which the present invention has been applied.
Figure 2:
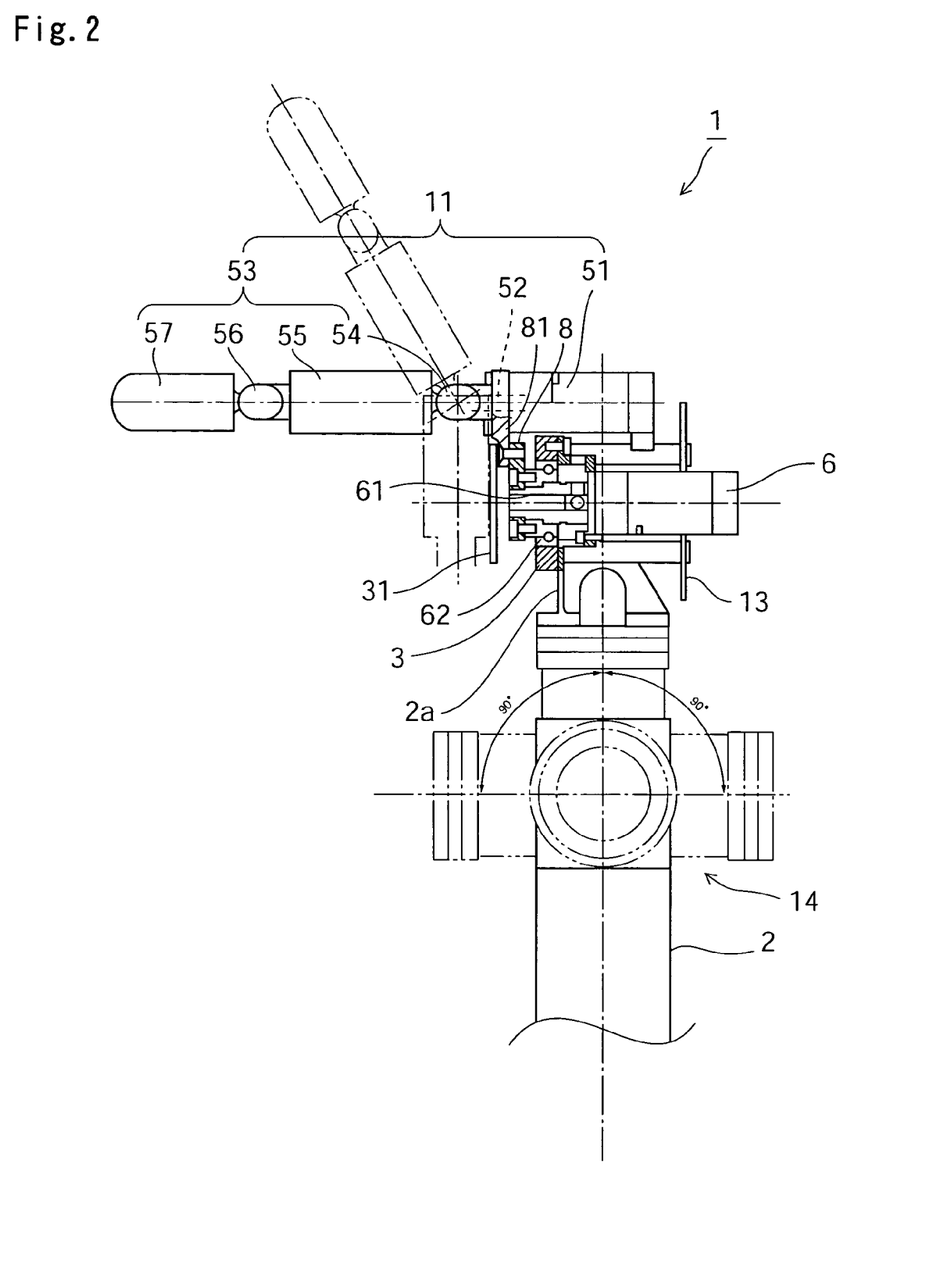
FIG. 2 is a side view showing a partial cross-section of the palm mechanism for a high-speed robot hand of FIG. 1.
Figure 3:
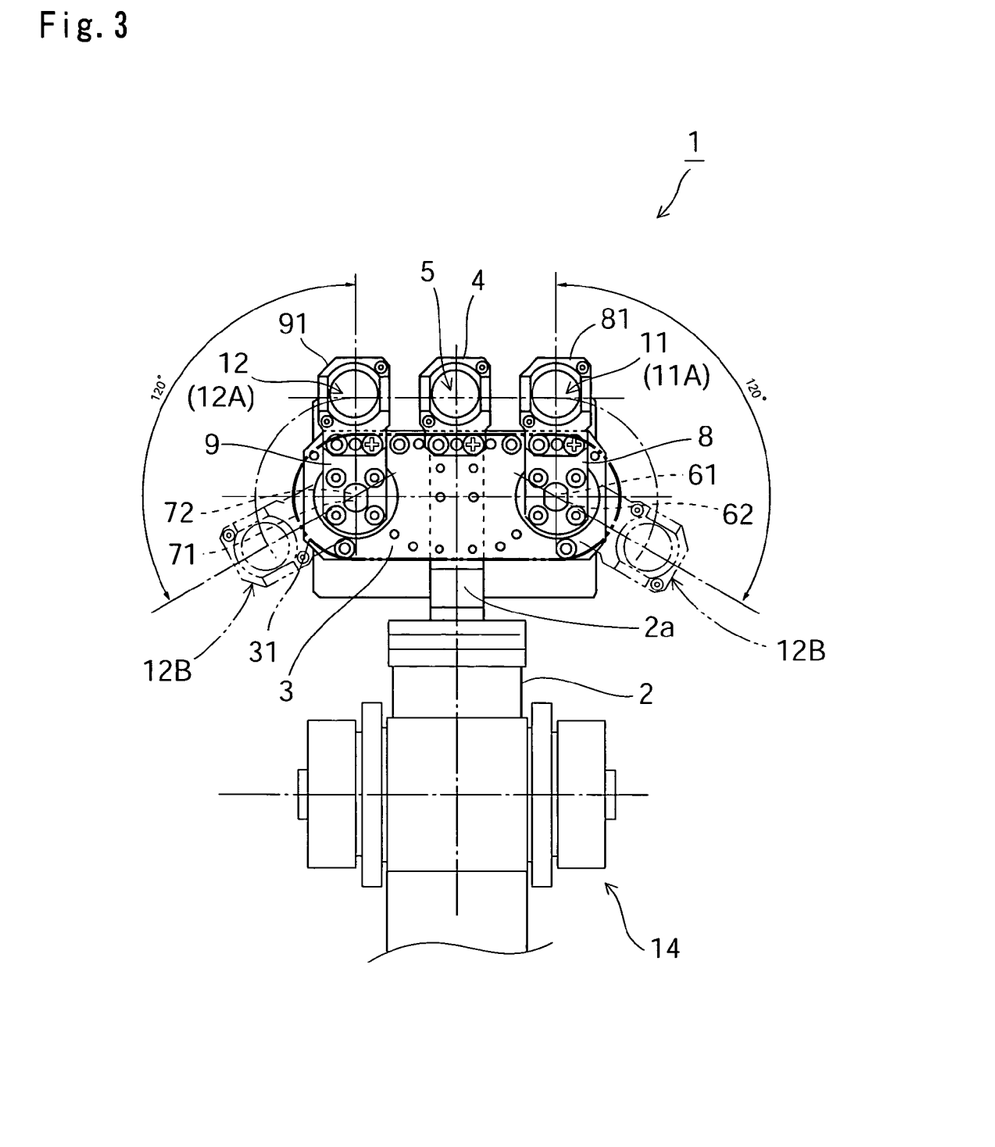
FIG. 3 is a front view showing the palm mechanism for a high-speed robot hand of FIG. 1.
Figure 4A:
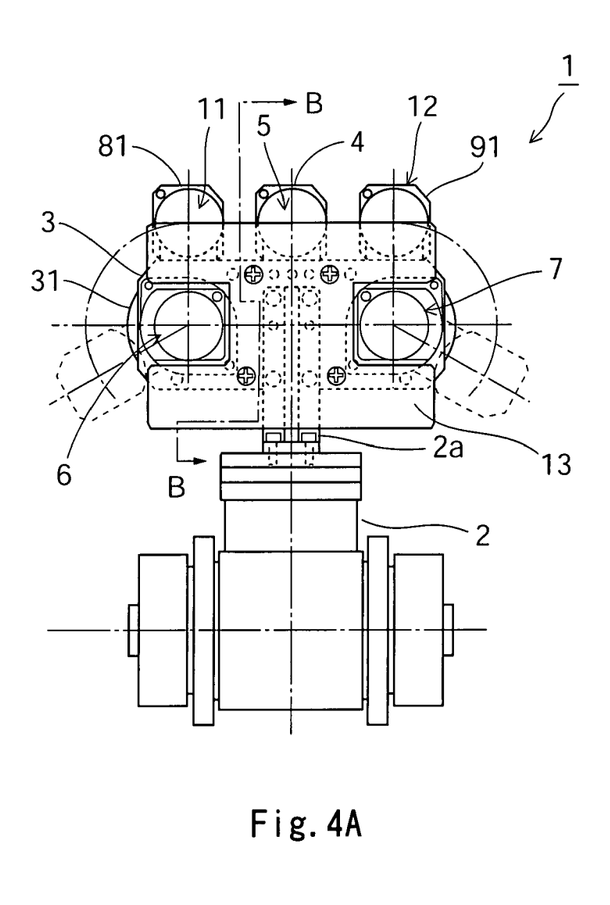
FIGS. 4A and 4B are a rear view and a cross-sectional view showing the palm mechanism for a high-speed robot hand of FIG. 1, respectively.
Figure 4B:
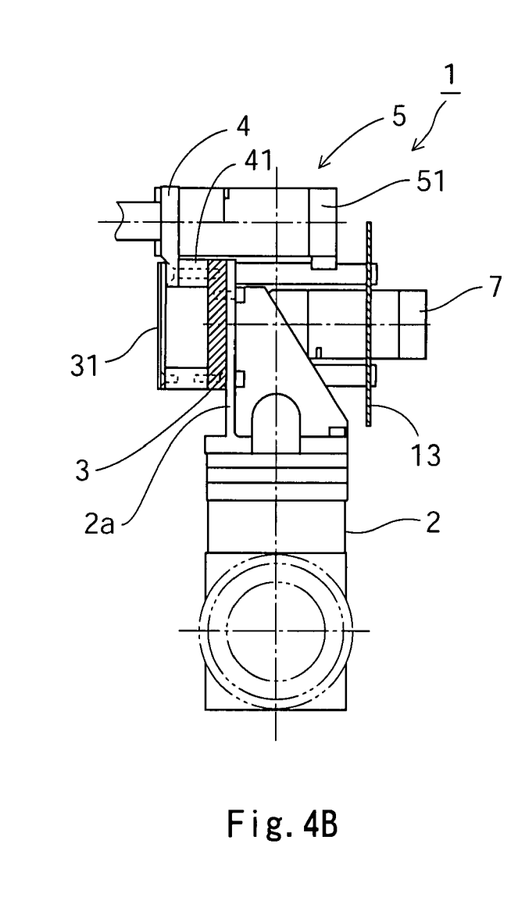

FIG. 1 is a top view showing a palm mechanism for a high-speed robot hand of the present embodiment, FIG. 2 is a cross-sectional view thereof, and FIG. 3 is a front view thereof. FIG. 4A is a rear view of the palm mechanism for a high-speed robot hand, and FIG. 4B is a cross-sectional view of the sectioned portion along the line B—B thereof. With reference to these drawings, a palm mechanism 1 for a high-speed robot hand has a vertically positioned rectangular palm plate 3, and three articulated finger units 5, 11, and 12. The articulated finger unit 5 can be controlled to respectively bend to an angle of 90° or a similar angle outward or inward from a linearly extended state, and this bending operation can be performed at high speed and with accuracy. This articulated finger unit 5 is fixed to a center portion of an upper long side edge on the palm plate 3, and identically structured articulated finger units 11 and 12 are disposed on both sides of the articulated finger unit 5. The rectangular palm plate 3 has four large chamfered corners.

The left and right articulated finger units 11 and 12 are respectively mounted on outer end parts of the turning plates 8 and 9. Inner end parts of these turning plates 8 and 9 are fixedly fitted in rotational output shafts of small-sized, lightweight servo actuators (turning actuators) 6 and 7 that have a large starting torque and are fixed to a rear surface of the palm plate 3, and these inner end parts extend in a direction perpendicular to the rotational output shafts. The articulated finger units 11 and 12 mounted on the outer end parts of these turning plates 8 and 9 are respectively capable of turning on an outside of left and right short sides of the palm plate 3. The units 11 and 12 are identical to the articulated finger unit 5 centrally positioned on the upper side of palm plate 3, and are mounted so as to project in a direction perpendicular to the surface of the palm plate 3 in a linearly extended state (a neutral state).

Describing these in further detail, the palm mechanism 1 for a high-speed robot hand has a mounting stand 2 mounted vertically to a floor or other surface. The rectangular palm plate 3 is vertically mounted on a mounting stand 2a, itself mounted in a top portion of the mounting stand 2, such that the longitudinal dimension of the plate is oriented sideways. An actuator-mounting frame 4 provided with a circular opening is mounted at the center position on the front surface of the upper end edge portion of the palm plate 3. In other words, the lower end portion of the actuator-mounting frame 4 is fixed to the palm plate 3 by way of a spacer 41, and the circular opening portion of the actuator-mounting frame 4 is oriented vertically while facing forward (Refer to FIG. 4(b)).

An actuator 51 for the articulated finger unit 5 is mounted on the actuator-mounting frame 4. The front-end portion of the actuator 51 is fixed to the actuator-mounting frame 4, and an articulated finger main body unit 53 coaxially connected to a rotational output shaft 52 of the actuator 51 projects forward through the circular opening of the actuator-mounting frame 4.

The finger main body unit 53 of the articulated finger unit 5 in the present example comprises a joint portion 54 disposed on a finger base side and connected to a front end of the rotational output shaft 52 of the actuator 51, a finger base portion 55 connected to a front side of the joint portion 54 on the finger base, a joint portion 56 disposed on the fingertip side and connected to the tip of this finger base portion 55, and a fingertip portion 57 connected to the front end of this joint portion 56 on the fingertip side.

Next, a pair of forward-oriented turning actuators 6 and 7 is fixed to a rear surface of the left and right end portions of the rectangular palm plate 3 in a direction perpendicular to the palm plate 3. Rotational output shafts 61 and 71 of these turning actuators 6 and 7 are rotatably supported by bearings 62 and 72 that are fixed to the palm plate 3. The turning plates 8 and 9 are fixed to leading end portions of the rotational output shafts 61 and 71 that project forward from these bearings 62 and 72 in a state extending parallel to the palm plate 3. Actuator-mounting frames 81 and 91 in which circular openings are formed are mounted in an outer ends of these turning plates 8 and 9. The articulated finger units 11 and 12 are respectively mounted in the actuator-mounting frames 81 and 91. The articulated finger units 11 and 12 have the same structure as the above-described articulated finger unit 5 positioned in the center of the palm plate 3, so the same key symbols are provided to the corresponding locations and a description of these is omitted. The articulated finger units 11 and 12 are fixed to the actuator-mounting frames 81 and 91 in the same manner as the articulated finger unit 5 described above.

A protecting plate 31 that protects the surface of the palm plate 3 is disposed on the front surface of the palm plate 3 in front of lower end portions of the actuator-mounting frames 4, 81, and 91. This protecting plate 31 is an elliptical plate extended in a lengthwise direction beyond the palm plate 3, as shown by the thick line composed of alternate long and two short dashes in FIG. 3, and is mounted parallel to the surface of the palm plate 3.

When the turning actuators 6 and 7 mounted on the rear surface of the palm plate 3 are driven, and the turning plates 8 and 9 that are fixed to the rotational output shafts 61 and 71 thereof are turned, the articulated finger units 11 and 12 can turn from upper end positions 11A and 12A adjacent to the articulated finger unit 5 to lower side positions 11B and 12B, which are rotated, for example, 120° along left and right semicircular external peripheral edge portions of the protecting plate 31 mounted on the front surface of the palm plate 3, as shown in FIG. 3.

A rectangular connector base plate 13 for supplying electricity is mounted in a location on a reverse side of the articulated finger units 5, 11, and 12, as shown in FIGS. 4A and 4B. The portions in which the turning actuators 6 and 7 are positioned on the connector base plate 13 are cut away, and rear end portions of the turning actuators 6 and 7 project rearward from the connector base plate 13.

Figure 5A:
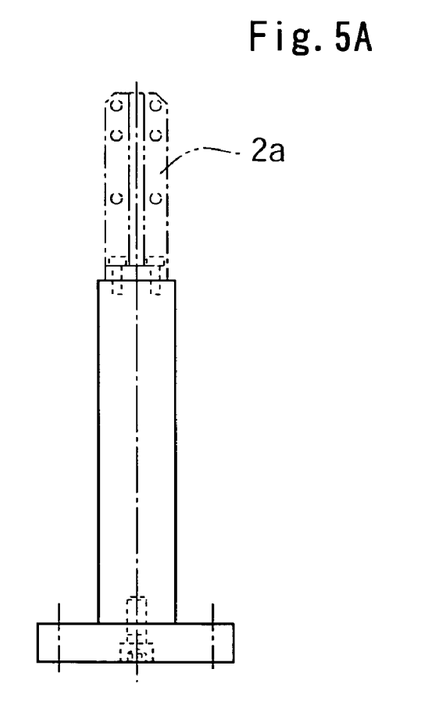
FIGS. 5A, 5B and 5C are respectively a front view, a side view, and a rear view showing a different example of the mounting stand of the palm mechanism for a high-speed robot hand of FIG. 1.
Figure 5B:
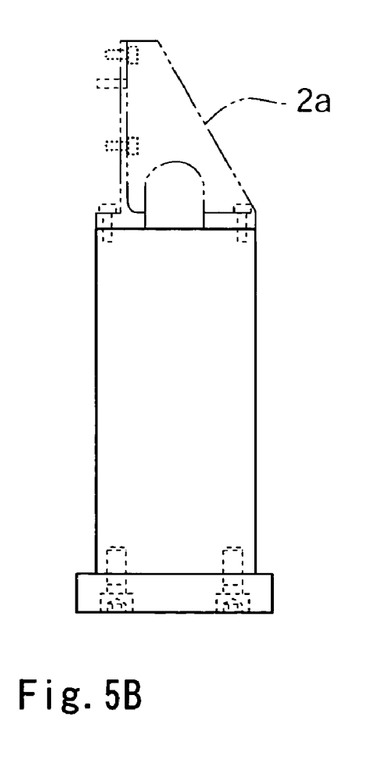
Figure 5C:
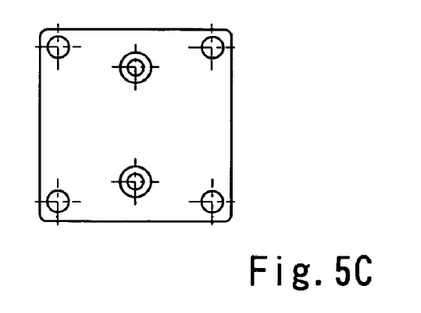

The mounting stand 2 comprises an intermediately positioned turning portion 14, and the top portions thereof are capable of turning 90° back and forth about the turning portion 14, as is apparent from FIG. 2. A device configured without the turning portion 14 may also serve as this mounting stand, as shown in FIG. 5.

(The Articulated Finger Unit)

Figure 6:
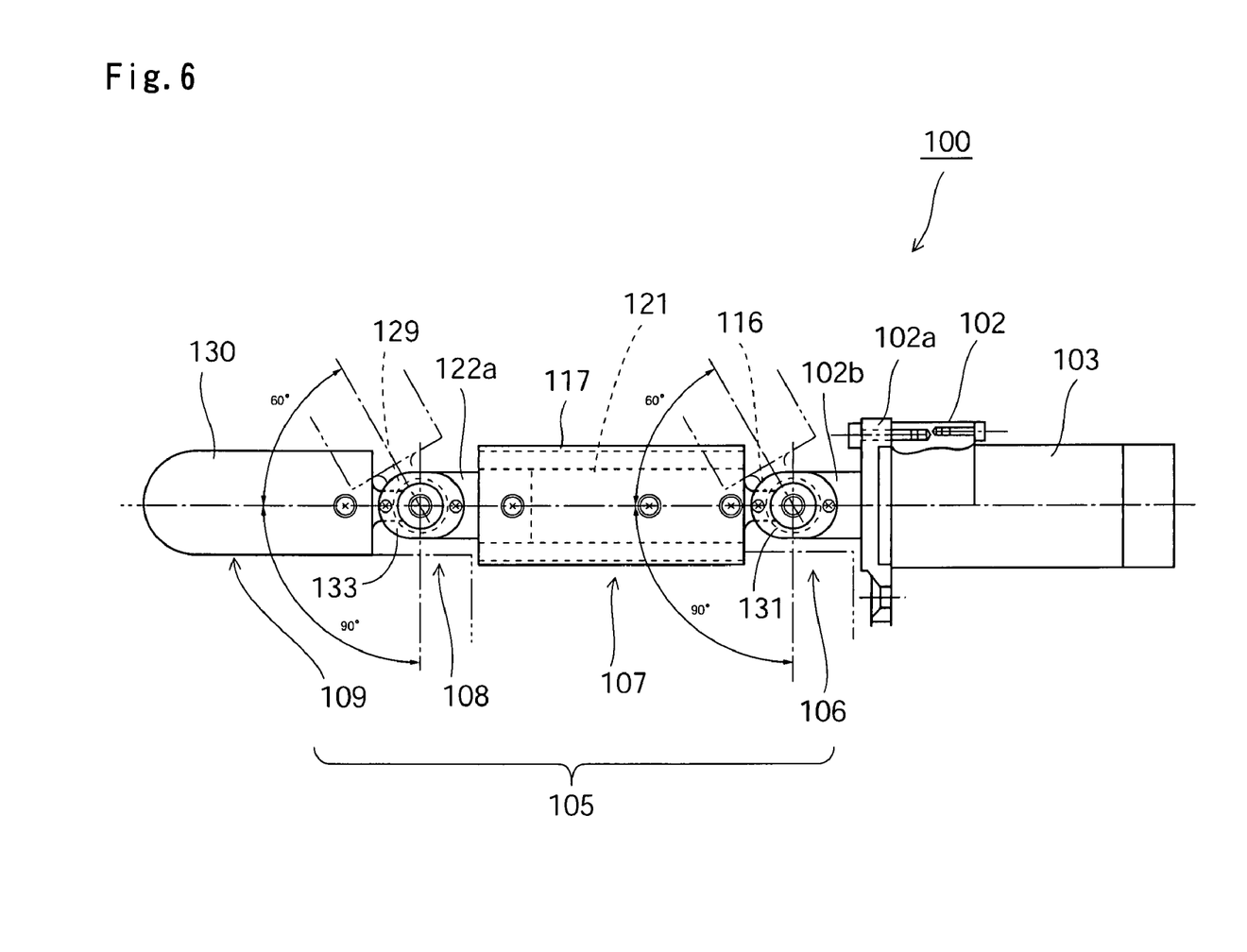
FIG. 6 is a top view of the articulated finger unit to which the present invention is applied.
Figure 7:
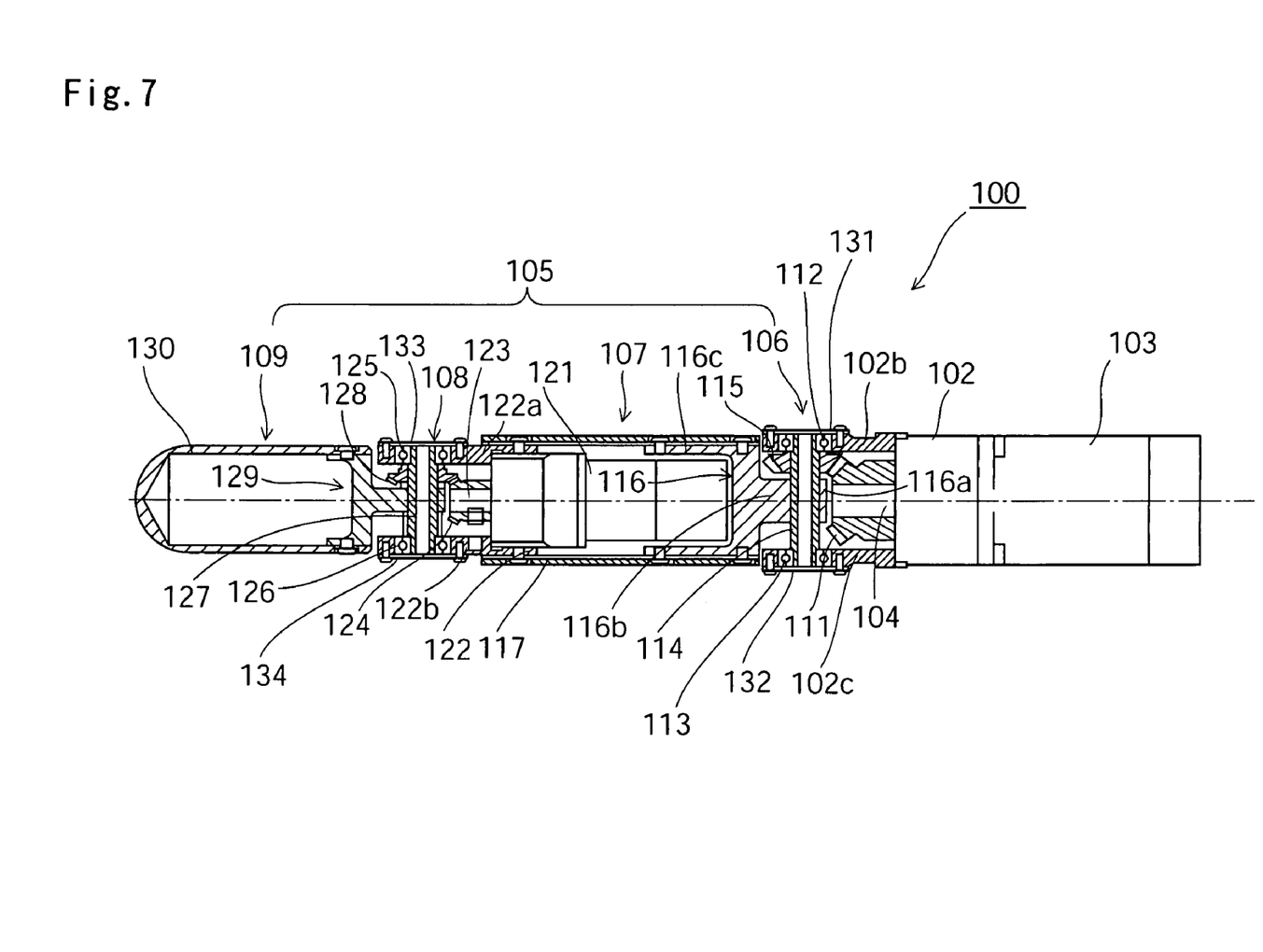
FIG. 7 is a longitudinal section of the articulated finger unit of FIG. 6.
Figure 8A:
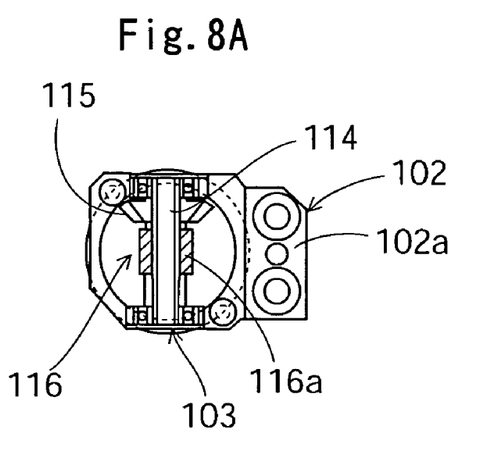
FIG. 8A is a cross-sectional view showing the joint portion on the finger base side of the articulated finger unit of FIG. 6.
Figure 8B:
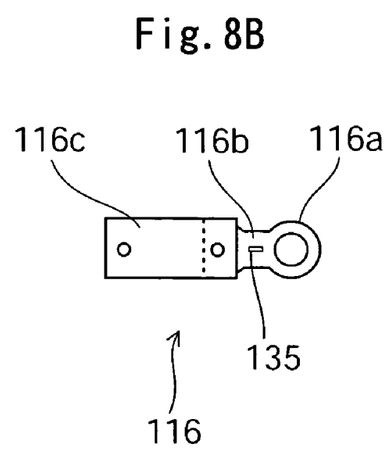
FIG. 8B is a top view showing the connecting member on the finger base side incorporated therein.
Figures 9A, 9B:
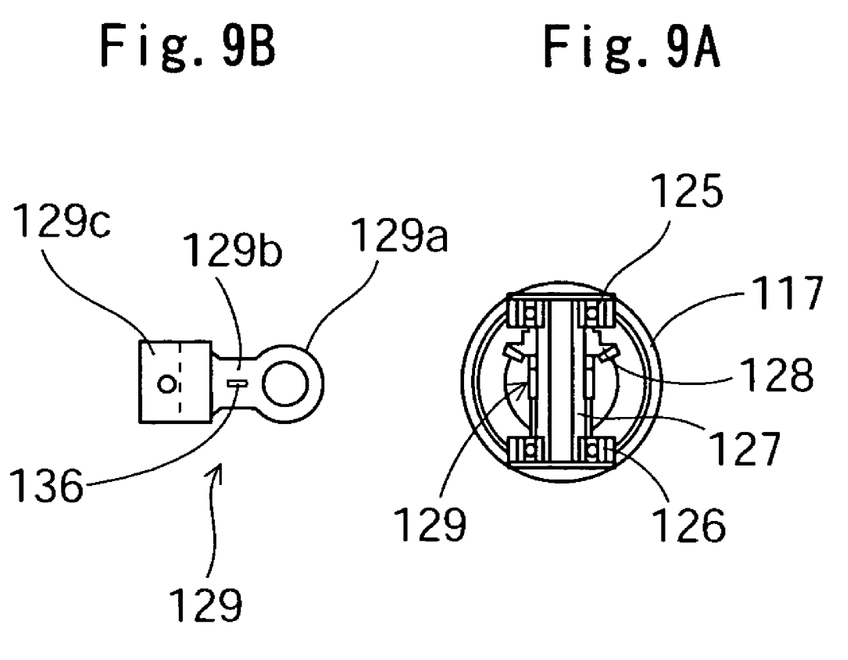
FIG. 9A is a cross-sectional view showing the joint portion on the fingertip side of the articulated finger unit of FIG. 6.
FIG. 9B is a top view showing the connecting member on the fingertip side incorporated therein.

Next, FIG. 6 is a top view that shows an articulated finger unit suitable for use as the articulated finger units 5, 11, and 12; and FIG. 7 is a cross-sectional view thereof. FIGS. 8A and 8B are respectively a cross-sectional view showing a joint portion on a finger base side of the articulated finger unit, and a top view showing a connecting member on the finger base side incorporated therein. FIGS. 9A and 9B are respectively a cross-sectional view showing a joint portion on a fingertip side of the articulated finger unit, and a top view showing a connecting member on fingertip side incorporated therein.

With reference to the drawings, the articulated finger unit 100 has a mounting flange 102, which is a constituent component corresponding to the mounting frame 4, 81, and 91; an actuator 103, which corresponds to the actuator 51 mounted on this mounting flange 102; and an articulated finger main body unit 105, which corresponds to the finger main body unit 53 connected to a rotational output shaft 104 of the actuator 103. The finger main body unit 105 comprises a joint portion 106 (the joint portion 54 on the finger base side) disposed on the finger base side and connected to the front end of the rotational output shaft 104 of the actuator 103, a finger base portion 107 (the finger base portion 55) connected to the front side of the joint portion 106 of this finger base, a joint portion 108 (the joint portion 56 on the finger tip side) disposed on the fingertip side and connected to the tip of this finger base portion 107, and a fingertip portion 109 connected to the front side of this joint portion 108 (the finger tip portion 57) on the fingertip side.

More specifically, with the cylindrical actuator 103 facing forward, the front-end portion thereof is fixed to a circular aperture casing portion 102a of the mounting flange 102, and the rotational output shaft 104 passes from the front end thereof through the circular aperture casing portion 102a and projects forward. A drive-side bevel gear 111 is coaxially fixed to the tip portion of this rotational output shaft 104.

Here, a pair of bearing housings 102b and 102c on the finger base side passes from the upper and lower ends of the front surface of the mounting flange 102 through the top and bottom positions of the drive-side bevel gear 111, and extends in a parallel manner. A top ball bearing 112 and a bottom ball bearing 113 are respectively mounted so as to be in coaxial positions on the tip portion of the bearing housings 102b and 102c, which are disposed on the finger base side and extended further forward than the drive-side bevel gear 111. Upper and lower ends of a joint shaft 114 on the finger base side are rotatably supported by the ball bearings 112 and 113 in a direction perpendicular (vertical, in the present example) to the axial direction of the rotational output shaft 104.

A driven-side bevel gear 115 is coaxially fixed to an external peripheral surface portion of an upper side of the joint shaft 114 in an axial direction thereof, and the driven-side bevel gear 115 engages the drive-side bevel gear 111. An annular boss 116a of a connecting member 116 is fixed at a center position in the axial direction of the joint shaft 114. The connecting member 116 comprises the annular boss 116a, a neck portion 116b that extends in a forward direction from this annular boss 116a, and a fork portion 116c that extends in a forward direction from a tip of the neck portion 116b in the form of an inverted "c." A cylindrical cover 117 on the base side is coaxially connected to this fork portion 116c.

Thus, the joint portion 106 on the finger base side connected to the front end of the rotational output shaft 104 of the actuator 103 comprises the upper and lower housings 102b and 102c disposed on the finger base side and formed on the mounting flange 102, the top and bottom ball bearings 112 and 113, the joint shaft 114 on the finger base side, the driven-side bevel gear 115 on the finger base side, and the connecting member 116 on the finger base side. The finger base portion 107 is formed from the cylindrical base-side cover 117 connected to the fork portion 116c of the connecting member 116 on the finger base side.

The joint portion 108 on the fingertip side and the fingertip portion 109 connected to the tip of the finger base portion 107 have a similar structure as the finger base portion 107 and the joint portion 106 on the finger base side. In other words, a second actuator 121 is coaxially incorporated in a hollow portion of the cover 117 on the base side, and the front-end portion of this actuator 121 is rotatably supported by an annular flange 122 similarly incorporated in the hollow portion of the cover 117 on the base side. An external peripheral surface of this annular flange 122 is fixed on an internal peripheral surface of the cover 117 on the base side.

A rotational output shaft 123 of the actuator 121 passes through of the hollow portion of the annular flange 122 and coaxially projects in a forward direction, and a drive bevel gear 124 on the fingertip side is coaxially fixed to the tip portion thereof. A pair of bearing housings 122a and 122b on the finger base side passes from upper and lower ends of the front surface of the annular flange 122 through top and bottom positions of the drive-side bevel gear 124, and extends in a parallel manner. A top ball bearing 125 and a bottom ball bearing 126 are respectively mounted so as to be in coaxial positions on the tip portion of the bearing housings 122a and 122b on the finger base side, which project further forward than the drive-side bevel gear 124. Upper and lower ends of a joint shaft 127 on the finger base side are rotatably supported by the ball bearings 125 and 126 in a direction perpendicular (vertical, in the present example) to the axial direction of the rotational output shaft 123.

A driven-side bevel gear 128 is coaxially fixed to an external peripheral surface portion of an upper side of this joint shaft 127 in an axial direction thereof, and the driven-side bevel gear 128 engages the drive-side bevel gear 124. An annular boss 129a of a connecting member 129 on the fingertip side is fixed at a center position in an axial direction of the driven-side bevel gear 128. The connecting member 129 comprises the annular boss 129a, a neck portion 129b that extends in a forward direction from this annular boss 129a, and a fork portion 129c that extends in a forward direction from a tip of this neck portion 129b in the form of an inverted "c" (refer to FIG. 9). A cylindrical cover 130 on the fingertip side whose tip is closed in the form of a hemisphere is coaxially connected to this fork portion 129c.

The present example is a double-jointed finger unit comprising a joint portion on the finger base side and a joint portion on the fingertip side, but a structure comprising a single joint, or a structure comprising three joints or more is also possible.

In the articulated finger unit 100 of the present example thus structured, a rotation of the rotational output shaft 104 is converted to rotational movement of the joint shaft 114 by way of a pair of bevel gears 111 and 115, and the connecting member 116 of which one end is fixed to this joint shaft 114 turns right and left at an angle of 90° or more about the joint shaft 114. It is thus possible to realize a lightweight, high-speed, and high-precision artificial finger in which the joint portions 106 and 108 can be controllably bent at an angle of 90° or more forward and backward or right and left, and which is capable of performing a variety of operations.

The actuators 103 and 121 have a structure that comprises a servomotor rated to have high speed and maximum torque for a short time by means of high-density winding and high-density component arrangement; a short-dimension, high-torque, and low-backlash unit-type harmonic drive gearing with a high reduction gear ratio (1/50 to 1/100, for example); and a small, lightweight, and high-resolution encoder with a fast response.

In the present example, oilless bevel gears with minimal backlash serve as the bevel gears 111, 115, 124, and 128. Such bevel gears are surface-hardened after gear cutting, lapped without a backlash by means of a high-precision bevel gear lapping machine, and impregnated with a solid lubricant on a teeth surface to allow backlash-less operation without oiling.

The following is a description of the backlash-less structure of the bevel gears 111 and 115 and the bevel gears 124 and 128 used in the joint portions of the present example. With reference to FIGS. 6 and 7, in the joint portion 106 on the finger base side, spring plates 131 and 132 are mounted on an upper end surface of the top ball bearing 112 and a lower end surface of the bottom ball bearing 113 in which upper and lower ends of the joint shaft 114 are rotatably supported by the ball bearings 112 and 113. The spring plates 131 and 132 are provided for applying axial propulsion in a center direction of the bevel gear cone to the joint shaft 114 so as to limit the axial displacement of the shaft 114. Likewise, spring plates 133 and 134 that function in a similar manner are mounted in the joint portion 108 on the fingertip side.

Alternatively, the bevel gears may be mounted in a backlash-less state by using the extending and flexing force of the rotational output shaft of the actuator.

A strain gauge is provided in the articulated unit 100 of the present example to detect torque applied on the finger unit. Namely, as shown in FIGS. 8A and 8B, a strain gauge 135 is mounted on a side surface of the neck portion 116b (square columnar portion) in the connecting member 116 of the joint portion 106 on the finger base side. Similarly, a strain gauge 136 is mounted on a side surface of the neck portion 129b in the connecting member 129 of the joint portion 108 on the fingertip side, as shown in FIGS. 9A and 9B. The torque applied on the joint portions 106 and 108 can be detected based on the output of the strain gauges 135 and 136. Torque can therefore be detected and torque control performed based on this detection without the need to base the operation on the motor current of the actuators 103 and 121.

The joint shafts 114 and 127 that define a center of bending of the joint portions 106 and 108 of the present example are hollow joint shafts. The lead wires of the strain gauge 136, the fingertip-side actuator 121, and other components disposed closer to the fingertip and away from the joint shafts 114 and 127 are laid using the hollow portions of these hollow joint shafts, making it possible to prevent the wires from becoming frayed or otherwise affected during rotation of the main joint shaft 108.

(Operation)

An example of an operation of the palm mechanism 1 for a high-speed robot hand in the present example thus configured is described below. For example, the articulated finger unit 11 on the left side is positioned at the upper end position 11A adjacent to articulated finger unit 5 in the center, and the articulated finger unit 12 is turned to the lower end position 12B and fixed in that position. In other words, the articulated finger unit 12 is positioned on the opposite side of the palm mechanism with respect to the articulated finger units 5 and 11. Rod-like or spherical objects can be gripped, picked, and thrown when relative positions of the articulated finger units 5, 11, and 12 are set and the articulated finger units 5, 11, and 12 are controllably bent in such a manner.

When the left and right articulated finger units 11 and 12 are turned from the upper end positions 11A and 12A and positioned 120° away at the lower end positions 11B and 12B, as shown by the imaginary line in FIGS. 1 and 3, gripping and picking operations can be easily and reliably performed.

It further is possible to pinch objects between both surfaces of the articulated finger unit 5 on the fixed side in the center and the articulated finger unit 11 or 12 on the left and right moveable sides. In this case, turning positions of the articulated finger units 11 and 12 on the left and right movable sides can be adjusted, and their distance from the articulated finger unit 5 on the fixed side in the center can also be adjusted. When the left and right articulated finger units 11 and 12 are bent upward while being separated by a predetermined distance, it is also possible to grasp and hold rod-like objects between the reverse portion (the top portion) and the mid portion (the bottom portion) of the articulated finger unit 5 on the fixed side.

Such operations can be performed in millisecond units of time, which is significantly faster than the motion of a human finger. This means that application can be made to catching high speed flying objects, high speed throwing, and retrieving flying objects.

(Other Embodiments)

The palm mechanism for a high-speed robot hand described above is configured with one fixed-side articulated finger unit 5 disposed in the center, and moveable-side articulated finger units 11 and 12 disposed on both sides. However, it is also possible to provide two or more fixed-side articulated finger units, and to have one, or three or more moveable-side articulated finger units. It is also possible to adopt a configuration in which fixed-side articulated finger units are disposed on both sides of the moveable-side articulated finger units, a configuration in which moveable-side and fixed-side articulated finger units are arranged in an alternating order, or configurations with other arrangements.

It is also possible to set the number of moveable-side articulated finger units to four, and to handle different objects with pairs of two each of these, either simultaneously or separated by time.

It is also possible to have a configuration which allows the moveable-side articulated finger units to turn forward and backward.

As described above, the palm mechanism for a robot hand of the present invention has a fixed-side articulated finger unit that extends forward from the palm plate, and a moveable-side articulated finger units that extend forward from the palm plate and that are capable of turning in the directions toward and away from the fixed-side articulated finger unit. The mechanism for turning the moveable-side articulated finger units also has a very simple structure.

According to the present invention, operations that include gripping, grasping, and throwing objects can therefore be performed rapidly and reliably because articulated finger units can be operated in a variety of patterns.

What is claimed is:

1. A palm mechanism for a robot hand comprising:
   a palm plate;
   at least a first and second finger units;
   a turning actuator fixed facing forward at a rear side of the palm plate, and
   a turning plate fixed perpendicularly to a rotational output shaft of the turning actuator;
   wherein the first and second finger units each comprise an actuator having a rotational output shaft, a finger main body, and a joint portion that links the rotational output shaft and the finger main body;
   the actuator of the first finger unit is fixed facing forward on the palm plate, and the joint portion and the finger main body project forward from a front surface of the palm plate,
   the actuator of the second finger unit is fixed facing forward on the turning plate, and the joint portion and the finger main body project forward from the front surface of the palm plate;
   the actuator is driven to allow the finger main body to be bent around the joint portion to a predetermined angle in a direction away from the front surface of the palm plate and in a direction toward the front surface of the palm plate from a center position that extends along the center axis of the rotational output shaft; and
   the turning actuator is driven to allow the second finger unit to be turned to a predetermined angle around a center axis of rotation of the turning actuator in a direction away from a position adjacent to the first finger unit.

2. The palm mechanism for a robot hand according to claim 1, comprising two second finger units and two turning actuators to turn the second finger units, wherein these two finger units are disposed on both sides of the first finger unit.

3. The palm mechanism for a robot hand according to claim 1, wherein the first and second finger units each have:
   a mounting flange fixed to the palm plate;
   said actuator fixed at its front-end portion to the mounting flange;
   a drive-side bevel gear coaxially fixed to a tip portion of the rotational output shaft that passes through and projects forward from the mounting flange;
   a pair of bearing housings that extends in the forward direction away from the front surface of the mounting flange through positions on both sides of the drive-side bevel gear;
   bearings mounted in the bearing housings;
   a joint shaft rotatably supported at both ends by the bearings, and aligned in a direction perpendicular to the center axis of the rotational output shaft of the actuator;
   a driven-side bevel gear coaxially fixed on an outer peripheral surface of the joint shaft, and engaged with the drive-side bevel gear;
   a connecting member having one end fixed to the joint shaft, and extending in a directions perpendicular to the joint shaft; and
   a finger main body connected to a tip portion of the connecting member.

4. The palm mechanism for a robot hand according to claim 3, wherein a spring plate is mounted on an external end surface of the bearings to restrict the axial bias of the driven-side bevel gear fixed to the joint shaft.

5. The palm mechanism for a robot hand according to claim 3, wherein a strain gauge is mounted on a side surface of the connecting member to detect torque transmitted through the connecting member.

6. The palm mechanism for a robot hand according to claim 3, wherein the joint shaft is a hollow shaft having a hollow portion for wiring.

7. The palm mechanism for a robot hand according to claim 3, comprising:
   a second connecting member connected to a tip portion of the finger main body;
   a second actuator coaxially mounted on the second connecting member, and housed in the hollow finger main body;
   a second drive-side bevel gear coaxially fixed to a tip portion of a rotational output shaft of the second actuator;
   a pair of second bearing housings that are formed on the second connecting member and are extended in the forward direction through positions on both sides of the second drive-side bevel gear;
   second bearings mounted in the second bearing housings;

a second joint shaft rotatably supported at both ends by the second bearings, and aligned in a direction perpendicular to a center axis line of the rotational output shaft of the second actuator;

a second driven-side bevel gear coaxially fixed on an outer peripheral surface of the second joint shaft, and engaged with the second drive-side bevel gear;

a third connecting member having one end fixed to the second joint shaft, and extending in the direction perpendicular to the second joint shaft, and a second finger main body connected to a tip portion of the third connecting member.

* * * * *